US008770733B2

(12) United States Patent
Ohya et al.

(10) Patent No.: US 8,770,733 B2
(45) Date of Patent: Jul. 8, 2014

(54) WATER-BASED INKJET INK, METHOD FOR PRODUCING INKJET PRINTED PRODUCT USING THE SAME, AND METHOD FOR PRODUCING WATER-BASED INKJET INK

(75) Inventors: Hidenobu Ohya, Tokyo (JP); Manabu Kaneko, Tokyo (JP); Masami Kato, Tokyo (JP)

(73) Assignee: Konica Minolta IJ Technologies, Inc., Tokyo (JP)

( * ) Notice: Subject to any disclaimer, the term of this patent is extended or adjusted under 35 U.S.C. 154(b) by 129 days.

(21) Appl. No.: 13/264,952

(22) PCT Filed: Apr. 20, 2010

(86) PCT No.: PCT/JP2010/056984
§ 371 (c)(1),
(2), (4) Date: Oct. 17, 2011

(87) PCT Pub. No.: WO2010/122994
PCT Pub. Date: Oct. 28, 2010

(65) Prior Publication Data
US 2012/0038725 A1 Feb. 16, 2012

(30) Foreign Application Priority Data

Apr. 23, 2009 (JP) .................................. 2009-105066
May 22, 2009 (JP) .................................. 2009-124076

(51) Int. Cl.
*B41J 2/01* (2006.01)

(52) U.S. Cl.
USPC .............................. 347/100; 347/102; 347/95

(58) Field of Classification Search
None
See application file for complete search history.

(56) References Cited

U.S. PATENT DOCUMENTS

| 5,417,747 A | * | 5/1995 | Arata et al. | 106/31.68 |
| 2005/0270351 A1 | * | 12/2005 | Mouri et al. | 347/103 |
| 2007/0242119 A1 | * | 10/2007 | Koganehira et al. | 347/100 |
| 2008/0106581 A1 | * | 5/2008 | Sanada et al. | 347/86 |
| 2008/0252709 A1 | * | 10/2008 | Ushiku | 347/102 |

FOREIGN PATENT DOCUMENTS

| EP | 0-974-626 | 1/2000 |
| JP | 09-263722 | 10/1997 |
| JP | 2000-044858 | 2/2000 |
| JP | 2004-114692 | 4/2004 |
| JP | 2004-204069 | 7/2004 |
| JP | 2005-113147 | 4/2005 |
| JP | 2005-220352 | 8/2005 |
| JP | 2006-022328 | 1/2006 |
| JP | 2006-282780 | 10/2006 |
| JP | 2006-282822 | 10/2006 |
| JP | 2006-299166 | 11/2006 |
| JP | 2007-119708 | 5/2007 |
| JP | 2007-253616 | 10/2007 |
| JP | 2007-297586 | 11/2007 |
| JP | 2007-321073 | 12/2007 |
| JP | 2008-019431 | 1/2008 |
| TW | WO-2007-044109 | * 1/2003 |
| WO | 2007/044109 | 4/2007 |

OTHER PUBLICATIONS

Supplementary European Search Report EP 10 76 7051.

* cited by examiner

*Primary Examiner* — Manish S Shah
*Assistant Examiner* — Alexander C Witkowski
(74) *Attorney, Agent, or Firm* — Lucas & Mercanti, LLP

(57) ABSTRACT

Disclosed is an inkjet ink which provides a high-quality image in that whitening of the recorded image film is inhibited, durability of the image is good, and there is no banding, and the like; inkjet injection stability and ink shelf life are excellent; and head maintenance returnability is excellent. Also disclosed are a method for producing an inkjet printed product using the same, and a method for producing a water-based inkjet ink. This inkjet ink comprises at least a) a pigment, b) a polymer dispersant comprising polyethylene oxide groups having an acid value of less than 50 mgKOH/g (c) acrylic copolymer resin, and (d) at least one water-soluble organic solvent selected from glycol ethers and 1,2-alkanediols having 4 or more carbons.

10 Claims, No Drawings

WATER-BASED INKJET INK, METHOD FOR PRODUCING INKJET PRINTED PRODUCT USING THE SAME, AND METHOD FOR PRODUCING WATER-BASED INKJET INK

This Application is a 371 of PCT/JP2010/056984 filed Apr. 20, 2010 which, in turn, claimed the priority of Japanese Patent Application Nos. 2009-105066 filed Apr. 23, 2009 and JP2009-124076, filed May 22, 2009, all three applications are incorporated by reference herein.

FIELD OF THE INVENTION

This invention relates to a water-based inkjet ink, a method for producing an inkjet printed product using the same, and a method for producing a water-based inkjet ink.

TECHNICAL BACKGROUND

In recent years, since ink-jet recording systems enable simple image formation at low cost, they have been applied to various printing fields such as photography, various types of printing, marking, and special printing such as color filters.

Ink-jet inks, employed in the above ink-jet recording systems, include a plurality of inks such as a water-based ink which employs water and a small quantity of an organic solvent, a non-water-based ink which employs an organic solvent and substantially does not employ water, a hot-melt ink which is solid at room temperature and is applied to printing while heated and molten, and an actinic radiation curable ink which is cured via actinic radiation such as light, and each of them is appropriately selected depending on the intended application.

In recent years, there have been developed ink-jet inks for industrial use which can be printed directly on a non-absorptive recording medium such as a polyvinylchloride sheet. Examples of these ink-jet inks are cited as: a solvent ink in which an organic solvent is used as a vehicle of an ink; and a UV ink containing a polymerizable monomer as a primary component of an ink. A solvent ink is dried by evaporating its solvent to the air, as a result, a solvent ink has a problem of emitting a large amount of VOC (Volatile Organic Compound), which becomes a social problem in recent years. There are other concerns for a worker about an odor or an effect for the safety. Therefore, it is required to provide equipment for making sufficient ventilation. A UV ink is made harden immediately after printing, therefore, an emission of VOC is close to zero, but many monomers to be used in the ink may have problem of skin sensitization. Moreover, there are requirement of incorporating an expensive UV light source into a printer, and it cannot be used for printers for every field.

In the above-described background, there has been developed an ink which can be printed also directly to a non-water absorptive recording medium, by using a water-based ink containing water as a major component which has been widely used in homes and has reduced effects on the environment.

There has been proposed a water-based ink containing a water miscible solvent selected from glycols and glycol ethers. Moreover, there has been proposed an ink containing a graft co-polymer binder which contains a hydrophobic backbone and a non-ionic and hydrophilic side-chain, wherein the graft co-polymer binder is soluble in a water-based vehicle and is not soluble in water (for example, refer to Patent Document 1).

Disclosed was a water-based pigment ink in which an ink was heat-fixed against a recording medium of vinyl film or coated by vinyl resin by employing an ink soluble resin (for example, refer to Patent Documents 2 and 3).

Further, there has been proposed a plurality of water-based inks which employs insoluble resin particles into an ink as a binder resin (for example, refer to Patent Documents 4 to 7).

However, these inks disclosed in Patent Documents were insufficient to obtain an image texture depending on species of a recording medium, and ejection stability, the recovery property after a nozzle clogging, or a storage stability of an ink was not fully satisfactory.

Further, when a binder resin was added to a water-based printing ink or a water-based inkjet ink so as to enhance durability of recorded image film, the image film caused to become white during drying process, resulting in extremely lowering gloss of an image, depending on species of pigment dispersant or solvent in an ink. This whitening phenomenon causes extreme damage to an image quality specifically in a non- (or slight-) absorptive recording medium such as glossy film or printing paper.

Thus, it is desired to develop an ink which can resolve all of a whitening of the recorded image film, loosing an image texture on some recording medium, ejection stability or a recovery property after a nozzle clogging, or a storage stability of an ink.

Prior Technical Document

Patent Document

Patent Document 1: Unexamined Japanese Patent Application Publication (hereinafter referred to as JP-A) No. 2000-44858
Patent Document 2: JP-A No. 2005-113147
Patent Document 3: JP-A No. 2007-297586
Patent Document 4: JP-A No. 2004-114692
Patent Document 5: JP-A No. 2005-220352
Patent Document 6: JP-A No. 2006-22328
Patent Document 7: JP-A No. 2006-282822

SUMMARY

Problems to be Solved by the Present Invention

In view of the foregoing, the present invention was achieved. An object of the present invention is to provide an inkjet ink which provides a high-quality image in that whitening of the recorded image film is inhibited, durability of the image is good, and there is no banding, and the like; inkjet injection stability and ink shelf life are excellent; and head maintenance returnability is excellent. Also provided are a method for producing an inkjet printed product using the same, and a method for producing a water-based inkjet ink.

Means to Solve the Problems

The above object has been attained by the following constitutions:
1. A water-based inkjet ink comprising at least a) a pigment, b) a polymer dispersant comprising polyethylene oxide groups having an acid value of less than 50 mgKOH/g, c) acrylic copolymer resin, and d) at least one water-soluble organic solvent selected from glycol ethers or 1,2-alkanediols having 4 or more carbon atoms.
2. The water-based inkjet ink of item 1 comprising silicone based or fluorine based surfactant.

3. The water-based inkjet ink of item 1 or 2, wherein a total amount of at least one water-soluble organic solvent selected from glycol ethers or 1,2-alkanediols having 4 or more carbon atoms is 3-15% by mass based on the water-based inkjet ink.
4. The a water-based inkjet ink of any one of items 1 to 3, wherein the acrylic copolymer resin is partially or completely neutralized by an amine.
5. The water-based inkjet ink of any one of items 1 to 4, wherein the polymer dispersant comprising polyethylene oxide groups having an acid value of less than 50 mgKOH/g is an acryl copolymer comprising polyethylene oxide groups.
6. The water-based inkjet ink of any one of items 1 to 5, wherein the acryl copolymer resin has an acid value of not less than 50 mgKOH/g and not more than 100 mgKOH/g.
7. The water-based inkjet ink of any one of items 1 to 6, wherein the acryl copolymer resin is synthesized by a monomer substantially comprising acryl or methacryl based monomer.
8. A method for producing an inkjet printed product, wherein the water-based inkjet ink of any one of items 1 to 7 is printed on a preliminary heated recording medium.
9. The method for producing an inkjet printed product of item 8, wherein the recording medium is a non-water-absorption recording medium.
10. The method for producing an inkjet printed product of item 8 or 9, wherein the water-based inkjet ink is printed followed by drying the recording medium by using drying member.
11. A method for producing an inkjet ink, wherein the inkjet ink comprises a pigment dispersed by using a polymer dispersant comprising polyethylene oxide groups having an acid value of less than 50 mgKOH/g.
12. The method for producing an inkjet ink of item 11, wherein a weight average molecular weight of the polymer dispersant comprising polyethylene oxide groups having an acid value of less than 50 mgKOH/g is not less than 5,000 and not more than 1,000,000.

Effects of the Invention

The present invention made it possible to provide an inkjet ink which provides a high-quality image in that whitening of the recorded image film is inhibited, durability of the image is good, and there is no banding, and the like; inkjet injection stability and ink shelf life are excellent; and head maintenance returnability is excellent, and a method for producing an inkjet printed product using the same, and a method for producing a water-based inkjet ink.

PREFERRED EMBODIMENT OF THE INVENTION

An optimal embodiment to practice the present invention will now be detailed.

In view of the foregoing, the inventors of the present invention conducted diligent investigations. As a result, the following was discovered, and the present invention was achieved. Namely, the inkjet ink which comprises at least a pigment, a polymer dispersant comprising polyethylene oxide groups having an acid value of less than 50 mgKOH/g, acrylic copolymer resin, and at least one water-soluble organic solvent selected from glycol ethers and 1,2-alkanediols having 4 or more carbons can provide a high-quality image in that whitening of the recorded image film is inhibited, durability of the image is good, and there is no banding, and the like; inkjet injection stability and ink shelflife are excellent; and head maintenance returnability is excellent.

In water-based printing ink or water-based inkjet ink, investigated was a method in which a binder resin was added to a water-based printing ink or a water-based inkjet ink so as to enhance durability of recorded image film or water resistance of a film after drying.

However, the image film caused to become white during drying process, resulting in extremely lowering gloss of an image, depending on species of pigment dispersant or solvent in an ink. Reason for this whitening phenomenon was considered that a non-volatile component such as acryl copolymer resin or pigment dispersion in ink increases entanglements with each others, resulting in being non-uniformly-precipitated. Further, solvent such as glycol esters or 1,2-alkanediol having carbon number of 4 or more which is employed for inhibiting repelling of ink drop at the recording medium tends to cause the whitening of the image film. Although reasons were not understood in detail, it was estimated that solubility of water soluble acryl copolymer resin lowered to cause to be precipitated, when content ratio of solvent in an ink became higher according to evaporating water in ink. This whitening phenomenon caused extreme damage to an image quality specifically in a non-(or slight-)absorptive recording medium such as glossy film or printing paper.

In view of the foregoing, the inventors of the present invention conducted diligent investigations. As a result, the following was discovered. An inkjet ink provides a high-quality image in that whitening of the recorded image film is inhibited, and durability of the image is good. This inkjet ink comprises a polymer dispersant comprising polyethylene oxide groups having an acid value of less than 50 mgKOH/g, acrylic copolymer resin, and a water-soluble organic solvent selected from glycol ethers and 1,2-alkanediols having 4 or more carbons.

Although the reason of the effect of the present invention is not cleared yet, it is supposed as follows.

In water-based inkjet ink of the present invention in which an acryl copolymer resin is employed as binder resin, an organic solvent for inhibiting repelling of ink drop at the recording medium is selected from glycol ethers and 1,2-alkanediols having 4 or more carbons, by employing a polymer dispersant comprising polyethylene oxide groups having lower acid value for pigment dispersion, interaction can not become excessively between acryl copolymer resin neutralized and dissolved by amine and polymer dispersant during drying and concentrating ink, whereby no agglomeration occurs to the extent of effecting in gloss or texture of image and whitening of the recorded image film is inhibited.

The water-based inkjet ink (hereinafter, also simply referred to as ink) of the present invention will now be detailed specifically.

(Polymer Dispersant Comprising Polyethylene Oxide Groups Having Acid Value of Less than 50 mgKOH/g)

At first, polymer dispersant comprising polyethylene oxide groups having an acid value of less than 50 mgKOH/g will be described. Polymer dispersant comprising polyethylene oxide groups having an acid value of less than 50 mgKOH/g is a polymer having an acid value of less than 50 mgKOH/g and the polymer has polyethylene oxide groups. It is supposed that in the polymer which has acid value of less than 50 mgKOH/g as well as polyethylene oxide groups, acid group is oriented to solvent side and maintains dispersion stability when ink has enough water, and when ratio of solvent becomes increased in drying step, polyethylene oxide group largely contributes to pigment dispersion. Thus, by employing the polymer having both acid group and polyethylene oxide group in one polymer, stable dispersability can be maintained without releasing the dispersant from pigment during changing solvent composition.

According to the present invention, employed is polymer dispersant comprising polyethylene oxide groups having an acid value of less than 50 mgKOH/g for dispersing pigment. By employing polymer dispersant comprising polyethylene oxide groups having an acid value of less than 50 mgKOH/g, it can inhibit interaction of polymer dispersant and acryl copolymer resin to agglomerate and precipitate and whitening of the recorded image film during ink drying process.

Polymer dispersants used for the present invention are copolymer containing polyethylene oxide structure and include modified polyacrylate, modified polyurethane, alkylphenol ethyleneoxide adduct, polyoxyethylene fatty acid esters, and polypropyleneglycol ethyleneoxide adducts. Specifically, in view of the effect of the present invention, preferred is acryl based copolymer having polyethylene oxide group. Specific examples of acryl based copolymer having polyethylene oxide group include polymer having polyethylene oxide group introduced to a side chain of styrene-(meth)acrylic acid copolymer, and styrene-(meth)acrylic acid-(meth)acrylic ester copolymer.

Acid value of polymer dispersant is less than 50 mgKOH/g. As acidic composition, it may contain acrylic acid, sulfonic acid and maleic acid or nonionic.

Specific examples of polymer dispersant comprising polyethylene oxide groups having an acid value of less than 50 mgKOH/g include Disperbyk-190 (acid value 10 mgKOH/g) (produced by BYK-Chemie GmbH), Floren TG-750W (acid value 40 mgKOH/g) (produced by KYOEISHA CHEMICAL CO., LTD.), Pluronic F-68 (nonionic) (produced by ADEKA CORPORATION) and efika4570 (produced by EFKA), without limitation thereto.

Acid value in the present invention is referred to as milligram amount of potassium hydroxide used for neutralizing acid contained in 1 g of non-volatile component of polymer dispersant, and is determined, for example, by acid value measurement according to Ms K-0070 Acid value measurement by hydrolysis (total acid value measurement). Further, acid value of product is often provided via information service by supplier. When acid value is indicated based on 1 g of product and volatile composition such as solvent is included in the dispersant product, it is converted in terms of 100% non-volatile composition.

Weight average molecular weight of polymer dispersant of the present invention is preferable not less than 5,000 and not more than 100,000, more preferable not less than 8,000 and not more than 50,000.

It is possible to determine the weight average molecular weight of acrylic resins of the present invention via gel permeation chromatography (GPC). Measurement conditions are as follows
Solvent: methylene chloride
Columns: SHODEX K806, K805, and K803G (produced by Showa Denko K. K., three columns were employed via connections)
Column temperature: 25° C.
Sample concentration: 0.1% by mass
Detector: RI Model 504 (produced by GL Sciences Inc.)
Pump: L6000 (produced by Hitachi Ltd.)
Flow rate: 1.0 ml/minute
Calibration curve: A calibration curve prepared by employing 13 samples of standard polystyrene STK (produced by Tosoh Corp., Mw=1,000,000-500) was employed. It is preferable to employ the 13 samples at nearly equal intervals.

(Acryl Copolymer Resin)

Acryl copolymer resin of the present invention will now be described.

The water-based inkjet ink of the present invention is characterized by containing acryl copolymer resin. By containing this acryl copolymer resin, ink enables to enhance durability of the image film and to apply water resistance after drying to the recording medium.

Specifically, it is preferable to use acryl copolymer resin neutralized by amine due to enhancing durability and water resistance described above.

In the present invention, acryl copolymer resin is referred to as a resin constituted by acryl/methacryl based monomer of not less than 80% by mass based on monomer ratio (by mass) constituting the resin. Acryl copolymer resin is preferable to synthesized by using monomer component substantially comprising acryl and/or methacryl based monomer. Herein, "substantially" means to include a state of 100%. One preferable embodiment is that monomer component of acryl and/or methacryl based monomer is not less than 95% based on monomer ratio. In acryl copolymer resin, monomer of infinitesimal quantity or without attempt may be included. However, substantial constitution by acryl/methacryl based monomer enables to be fully effective in the present invention. More preferably, the resin is constituted by 100% of acryl/methacryl based monomer. When more styrene component is included in resin composition of the ink, it enables to have high gloss. However, on the other hand, it often tends to reduce friction resistance and adhesion. Even though reasons are not understood in detail, it is supposed that since styrene has poor adhesion to substrate or the film is too hard and lack of flexibility, whereby crack or peel causes in the film because of inability to follow to specifically flexible substrate.

Further, in monomer constituting acryl copolymer resin of the present invention, a total mass of monomer of (meth)acrylic acid alkyl ester having alkyl group of 2-8 carbons, methyl methacrylate and acid is specifically preferable not less than 80%, in view of enhancing friction resistance of image film.

Content of acryl copolymer resin used for the present invention, is not less than 2% by mass and not more than 8% by mass. In case of content of acryl copolymer resin being in this range, it is easy to balance good image durability and ejection stability.

In the present invention, acryl copolymer resin is preferable acryl copolymer resin neutralized by amine. Amines for neutralizing acid group derived from hydrophilic monomer of acryl copolymer resin include ammonia, alkanol amines, and alkyl amines. In view of enhancing durability, it is preferable to neutralize by using amines having boiling point of less than 200° C. As acryl copolymer resin neutralized by amine, both ones in which acid group is partially neutralized and completely neutralized may be employable.

In the present invention, it is preferable that acryl copolymer resin exists in a resolved state in the ink. It is useful to neutralize acryl copolymer resin by using amine.

In acryl copolymer resin related to the present invention, acid group is preferable carboxyl group or sulfonic acid group, and also acid value is preferable less than 300 mgKOH/g, more preferable less than 100 mgKOH/g. Lower limit is preferable not less than 50 mgKOH/g. Namely, it is preferable not less than 50 mgKOH/g and not more than 300 mgKOH/g, more preferable not less than 50 mgKOH/g and not more than 100 mgKOH/g, in view of effecting the present invention. Even when acryl copolymer resin is acryl copolymer resin neutralized by amine, acid value is preferable in the above range. When resin has acid value of not less than 50 mgKOH/g, since resin can be eliminated by resolution or physical rubbing process even when drying causes at nozzle of inkjet head, thereby excellent maintenance property can be applied. Further, in case of acid value being less than 100 mgKOH/g, excellent friction resistance can be maintained.

Further, the resin of the present invention preferably has a glass transition temperature (Tg) of not less than 20° C. and less than 100° C. In case of Tg being not less than 20° C., excellent friction resistance can be obtained as well as blocking is inhibited. In case of Tg being less than 100° C., excellent adhesion of image film can be maintained.

As acryl copolymer resin, copolymerized resin of hydrophobic monomer and hydrophilic monomer can be employable. Specific examples of hydrophobic monomer include acrylic esters (butyl acrylate, 2-ethylhexyl acrylate, or 2-hydroxyethyl acrylate), methacrylic esters (ethyl methacrylate, butyl methacrylate, or glycigyl methacrylate), and styrene. Specific examples of hydrophilic monomer include acrylic acid, methacrylic acid and acryl amide.

As molecular weight of acryl copolymer resin, resin having weight average molecular weight of 3,000 to 80,000 are employable, preferable 10,000 to 50,000.

As Tg of acryl copolymer resin, −30° C. to 100° C. are employable, preferable 20° C. to 80° C.

Solution polymerization method is preferable for polymerization method of acryl copolymer resin.

(Pigments)

Next, pigment related to the present invention will now specifically be described As a pigment usable for an ink according to the present invention, those conventionally well-known can be used with no limitation. Any water-dispersible pigments and solvent-dispersible pigments are usable. For example, organic pigments such as insoluble pigments or lake pigments and inorganic pigments such as carbon black can preferably be used.

Such insoluble pigments are not specifically limited. Preferable are, for example, azo, azomethine, methine, diphenylmethane, triphenylmethane, quinacridone, anthraquinone, perylene, indigo, quinophtharone, isoindolinone, isoindoline, azine, oxazine, thiazin, dioxazine, thiazole, phthalocyanine, and diketopyrrolopyrrole.

As specific pigments which are preferably usable, the following pigments are listed:

As magenta or red pigments, listed are, for example, C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 48:1, C.I. Pigment Red 53:1, C.I. Pigment Red 57:1, C.I. Pigment Red 122, C.I. Pigment Red 123, C.I. Pigment Red 139, C.I. Pigment Red 144, C.I. Pigment Red 149, C.I. Pigment Red 166, C.I. Pigment Red 177, C.I. Pigment Red 178, C.I. Pigment Red 202, C.I. Pigment Red 222, and C.I. Pigment Violet 19.

As orange or yellow pigments, listed are, for example, C.I. Pigment Orange 31, C.I. Pigment Orange 43, C.I. Pigment Yellow 12, C.I. Pigment Yellow 13, C.I. Pigment Yellow 14, C.I. Pigment Yellow 15, C.I. Pigment Yellow 15:3, C.I. Pigment Yellow 17, C.I. Pigment Yellow 74, C.I. Pigment Yellow 93, C.I. Pigment Yellow 128, C.I. Pigment Yellow 94, and C.I. Pigment Yellow 138.

As green or cyan pigments, listed are, for example, C.I. Pigment Blue 15, C.I. Pigment Blue 15:2, C.I. Pigment Blue 15:3, C.I. Pigment Blue 16, C.I. Pigment Blue 60, and C.I. Pigment Green 7.

Further, as black pigments, C.I. Pigment Black 1, C.I. Pigment Black 6, and C.I. Pigment Black 7 are listed.

The average particle diameter of a pigment dispersion used for an ink according to the present invention is preferably not less than 50 run and less than 200 nm. When the average particle diameter of pigment dispersion is less than 50 nm or more than 200 nm, pigment dispersion tends to unstable and results in causing deterioration on storage stability.

Particle diameter determination can be carried out using a commercially available particle diameter analyzer employing, for example, a dynamic light scattering method, or an electrophoretic method. Of these, dynamic light scattering method is heavily used due to simple and accurate in this particle diameter range.

Any pigment used in the present invention is preferably used via dispersion using a homogenizer, together with polymer dispersants, as well as additives required for various desired purposes. As the homogenizer, usable are a well-known ball mill, sand mill, line mill, and high-pressure homogenizer. Of these, dispersion by sand mill is preferably used due to sharp particle size distribution can be obtained. Further, zirconia or zircon is preferable as a material for beads which is used for sand mill in view of broken pieces or contamination of ionic component. Further, diameters of beads are preferable 0.3-3 mm.

Further, according to the ink of the present invention, mass ratio of pigment to acryl copolymer resin (pigment/acryl copolymer resin) is preferable not less than 0.02 and not more than 1.4, in view of image film strength.

(Water-Soluble Organic Solvent Selected From Glycol Ethers or 1,2-alkanediols Having 4 or More Carbon Atoms)

Next, water-soluble organic solvent selected from glycol ethers or 1,2-alkanediols having 4 or more carbon atoms will be described.

Ink used for the present invention is characterized by containing $a_t$ least one of water-soluble organic solvent selected from glycol ethers or 1,2-alkanediols having 4 or more carbon atoms. 1,2-alkanediol preferably has 4 or more carbon atoms in view of enhancing wettability to the recording medium and 8 or less carbon atoms in view of solubility in ink and ejecting stability.

Specific examples of glycolethers include ethylene glycol monoethyl ether, ethylene glycol monobutyl ether, diethylene glycol monobutyl ether, diethylene glycol monoethyl ether, triethylene glycol monobutyl ether; propyleneglycol monopropyl ether, dipropylene glycol monomethyl ether; dipropylenee glycol monopropyl ether, and tripropylene glycol monomethyl ether.

Specific examples of 1,2-alkanediols having 4 or more carbon atoms include 1,2-butanediol, 1,2-pentanediol, 1,2-hexanediol, and 1,2-heptanediol.

Specifically preferable water-soluble organic solvent is propyleneglycol monoalkyl ether, dipropylene glycol monoalkyl ether; tripropylenee glycol monoalkyl ether, and 1,2-hexanediol. Further, in propyleneglycol monoalkyl ether, dipropylene glycol monoalkyl ether; and tripropylenee glycol monoalkyl ether, preferred is to select one having in the range of 1-3 carbon atoms at monoalkyl ether moiety, in view of balancing between the effect of the present invention and storage stability.

As content of these solvents, 3% by mass to 15% by mass based on total ink mass is preferable in view of balancing image quality and storage stability.

In the ink of the present invention, known water-soluble organic solvents may be added to the extent that the targeted effects of the present invention are not impaired.

Specifically, a water-soluble solvent is preferable, and listed are such as alcohols (such as methanol, ethanol, propanol, isopropanol, butanol, isobutanol, secondary butanol, and tertiary butanol), polyhydric alcohols (such as ethylene glycol, diethylene glycol, triethylene glycol, polyethylene glycol, propylene glycol, dipropylene glycol, polypropylene glycol, butylenes glycol other than 1.2-, hexanediol other than 1.2-, pentanediol other than 1.2-, glycerin, hexanetriol and thioglycol), amines (such as ethanolamine, diethanolamine, triethanolamine, N-methyldiethanolamine, N-ethyldiethanolamine, morpholine, N-ethylmorpholine, ethylenediamine, diethylenediamine, triethylenetetramine, tetraethylenepentamine, polyethyleneimine, pentamethyldiethylenetriamine and tetramethylpropylenediamine), and amides (such as formamide, N,N-dimethylformamide and N,N-dimethylacetoamide).

When polyvinylchloride is used for a recording medium, water-soluble organic solvent having high swelling or soluble power to polyvinyl chloride is preferably used in view of enhancing fixing of pigment as colorant. Specific example include hetrocyclic compounds (such as 2-pyrrolidone, N-methyl-2-pyrrolidone, cyclohexyl pyrrolidone, 2-oxazolidone and 1,3-dimethyl-2-imidazolidione) and sulfoxides (such as dimethyl sulfoxide).

(Surfactant)

Next, surfactant employable to the present invention will be described.

In the present invention, surface tension of the ink is preferably adjusted to not more than 32 mN/m and more preferably to not more than 30 mN/m with respect to increasing permeability against water absorptive recording medium or wettability against a water non-absorptive recording medium.

Various surfactants can be utilized without limitation, as long as objects of the present invention are impaired and the surface tension of the ink can be adjusted not more than 32 mN/m. In view of balancing both image quality and storage stability, it is preferable to contain fluorine type or silicone type surfactant which has high ability to reduce static surface tension.

Further, preferably employed are anionic surfactants such as dioctyl sulfosuccinate, or nonionic surfactant such as relatively low molecular weight of polyoxyethylene alkylether, polyoxyethylene alkylohenylether, acetylene glycols, pluronic type surfactant, and sorbitan derivatives, which has high ability to reduce dynamic surface tension. Fluorine type and/or silicone type surfactant and the surfactant having high ability to reduce dynamic surface tension described above are preferably used in combination.

A silicone type surfactant is those in which a side chain or a terminal of dimethylpolysiloxane is polyether modified, and such as KF-351A and KF-642 produced by Shin-Etsu Chemical Co., Ltd.; and BYK347 and BYK348 produced by BYK-Chemie GmbH. are available on the market.

Fluorine type surfactant is a surfactant in which a part or all of hydrogen atoms bonded to carbon atom in hydrophobic group of general surfactant are replaced by fluorine atom. Of these, fluorine type surfactant having a perfluoro alkyl group or a perfluoro alkenyl group is preferably used.

Specific examples include Megafac F produced by Dainippon ink, Surflon produced by Asahi glass, Zonyl produced by E.I. DuPont Nemerus & Co., and Ftergent Series produced by Neos Co., Ltd.

Anionic, nonionic, and amphoteric fluorine type surfactant each can be preferably employed. As anionic fluorine type surfactant, listed are Ftergent 100 and 150 produced by Neos Co., Ltd. As nonionic fluorine type surfactant, listed are Megafac F470 produced by Dainippon ink, Surflon S-141 and 145 produced by Asahi glass. As amphoteric fluorine type surfactant, listed are Surflon 5-131 and 132 produced by Asahi glass.

<Other Additives>

An ink according to the present invention may further contain additives for various purposes. Depending on intended purposes to enhance various performances such as ejection stability, print head and ink cartridge compatibility, storage stability, and image storage stability, there can selectively be used, as appropriate, well-known additives such as viscosity regulating agents, specific resistance regulating agents, coated film forming agents, UV absorbents, antioxidants, anti-fading agents, antifungal agents, anti-stain agents, and pH regulation agent including, for examples, oil droplet fine particles such as liquid paraffin, dioctyl phthalate, tricresyl phosphate, or silicone oil; UV absorbents described in JP-A Nos. 57-74193, 57-87988, and 62-261476; anti-fading agents described in JP-A Nos. 57-74192, 57-87989, 60-72785, 61-146591, 1-95091, and 3-13376; and optical brightening agents described in JP-A Nos. 59-42993, 59-52689, 62-280069, 61-242871, and 4-219266.

(Recording Medium)

Next, a recording medium utilized in the invention will be explained

The ink of this invention is suitable for printing not only on a water non-absorptive medium such as a polyvinyl chloride sheet but also on a water absorptive recording medium such as ordinary paper, coated paper and inkjet exclusive paper.

The ink of this invention can form excellent inkjet image not only on a water absorptive recording medium but also on a water non-absorptive medium.

A non-absorptive medium includes such as a polymer sheet, a board (such as soft vinyl chloride, hard vinyl chloride, acryl board and polyolefin types), glass, tile, rubber and synthetic paper. A low-absorptive or absorptive recording medium includes such as plain paper (copy paper, plain paper for printing), coated paper, art paper, ink-jet exclusive paper, ink-jet glossy paper, corrugated cardboard paper and wood.

Specifically, a water non-absorptive recording medium having polyvinyl chloride at least on the recording side exhibits excellent image quality and image fastness.

Specific examples of a recording medium comprising polyvinyl chloride include SOL-371G, SOL373M and SOL-4701 (produced by Vigteqnos Co., Ltd.); glossy vinyl chloride (produced by Systemgraphi Co., Ltd.); KSM-VS, KSM-VST and KSM-VT (produced by Kimoto Co., Ltd.); J-CAL-HGX, J-CAL-YHG and J-CAL-WWWG (produced by Kyosyo Co., Ltd. Osaka); BUS MARK V400F vinyl and LITEcal V-600F vinyl (Produced by Flexcon Container, Inc.); FR2 (produced by Hanwha Corp.); LLBAU13713 and LLSP20133 (produced by Sakurai Co., Ltd.); P-370B and P-400M (produced by Kanbo Pras Corp.); S02P, S12P, S13P, S14P, S22P, S24P, S34P and S27P (produced by Grafityp UK Ltd.); P-223RW, P-224RW, P-249ZW and P-284ZC (produced by Lintec Corp.); LKG-19, LPA-70, LPE-248, LPM-45, LTG-11 and LTG-21 (produced by Shinseisha Co., Ltd.); MPI3023 (produced by Toyo & Engineering Corp.); Napoleongloss glossy vinyl chloride (produced by Niki Electronics Co, Ltd.); JV-610 and Y-114 (produced by IKC Co., Ltd.); NU-CAPVC and NU-SPVCGT (produced by Nitie Corp.); 3101/H12/P4, 3104/H12/P4, 3104/H12/P4S, 9800/H12/P4, 3100/H12/R2, 3104/H12/R2, 1445/H14/P3 and 1438/One Way Vision (produced by AMC Pancke AG., Division Intercoat); JTS 129PM, JT5728P, JT5822P, JT5829P, JT5829R, JT5829PM, JT5829R and JT5929PM (produced by Mactac AG.); MPI1005, MPI1900, MPI2000, MPI2001, MPI2002, MPI3000, MPI3021, MPI3500 and MPI3501 (produced by Avery Corp.); AM-101G and AM-501G (produced by GinIchi Corp.); FR2 (produced by Hanwha Japan Co., Ltd.), AY-15P, AY-60P, AY-80P, DBSP137GGH and DBSP137GGL (produced by Insight Inc.); SJT-V200F and SJT-V400E-1 (produced by Hiraoka & Co., Ltd.); SPS-98, SPSM-98, SPSH-98, SVGL-137, SVGS-137, MD3-200, MD3-301M, MD5-100, MD5-101M and MD5-105 (produced by Metamark Corp.); 640M, 641 G, 641M, 3105M, 3105SG, 3162G, 3164G, 3164M, 3164XG, 3164XM, 3165G, 3165SG, 3165M, 3169M, 3451SG, 3551G, 3551M, 3631, 3641M, 3651G, 3651M, 3651SG, 3951G, 3641M (produced by Orafol AG.); SVTL-HQ130 (Lami Corporation Inc.), SP300 GWF and SPCLEARAD vinyl (produced by Catalina Co., Ltd.); RM-SJR (produced by Ryoyoshoji Co., Ltd.), Hi Lucky and New Lucky PVC (manufactured by LG Corp.); SIY-110, SIY-310 and SIY-320 (produced by Sekisui Chemical Co., Ltd.); PRINT MI Frontlit and PRINT XL Light weight banner (produced by Endutex Corp.); RIJET 100, RIJET 145 and RIJET 165 (produced by Ritrama Ltd.); NM-SG and NM-SM (produced by Nichiei Kako Co., Ltd.); LTO3GS (Rukio Co., Ltd.); Easyprint 80 and Performanceprint 80 (produced by Jetgraph Co., Ltd.); DSE 550, DSB 550, DSE 800G, DSE 802/137, V250WG, V300WG and V350WG (produced by Hexis GmbH.) and Digital White 6005PE and 6010PE (produced Multifix Corp.).

(Method for Inkjet Recording and Method for Producing Inkjet Printed Product)

In a method for inkjet recording and a method for producing inkjet printed product by using the ink according to the present invention, printing is preferably performed with heating a recording side of a recording medium. Controlling a temperature via heating a recording side of a recording medium to the predetermined temperature is preferable due to improve remarkably drying and a viscosity increase rate of the ink after printing ink onto the recording medium as well as durability of images.

As for the heating temperature, heating is preferably performed to make the surface temperature of the recording side of the recording medium at not less than 35° C. and not more than 90° C. By controlling temperature of the recording side of the recording medium at not less than 35° C. and not more than 90° C., stable printing can be performed with shortening time consuming for drying and without large influence against ink ejection behavior, in addition to obtaining high image quality and sufficient image durability. It is more preferable to make the surface temperature of a recording medium of not less than 40° C. and not more than 60° C.

As for a heating method, selected can be such as a method in which a heater is installed in a medium transport system or in a platen member and heating is performed by a contact mode from the bottom of a recording medium, or a method in which heating is performed by a non-contact mode from the bottom or from the top of a medium by use of such as a lamp.

Further, in a method for inkjet recording and method for producing inkjet printed product according to the present invention, it is preferable to employ drying means for eliminating unnecessary organic solvent after recording. As for a drying method, selected or combined can be such as a method in which drying is performed by contacting back side of the recording medium with heat roller or flat heater, a method in which warm air is blown onto printed surface by dryer, and a method in which volatile component is eliminated by reduced pressure treatment.

(Inkjet Head)

The inkjet head used to carry out image formation by ejecting an ink according to the present invention may be either an on-demand system or a continuous system. Further, as the ejection system, there can be used any of the ejection systems including an electrical-mechanical conversion system (for example, a single cavity type, a double cavity type, a vendor type, a piston type, a share mode type, and a shared-wall type) and an electrical-thermal conversion type (for example, a thermal ink jet type and a BUBBLE JET (a registered trademark) type).

EXAMPLES

In the following, this invention will be specifically explained with reference to the example, but this invention not limited thereto. Incidentally, the expression of "part" or "%" referred to in Examples represents "part by mass" or "% by mass" unless otherwise specified.

Example 1

Preparation of Polymer Dispersant

Synthesis of Styrene-Acryl Resin 1

Into a four-neck flask provided with a mechanical stirrer, a nitrogen gas directing tube, a condenser, and a dropping funnel, were loaded 50 g of isopropyl alcohol and 150 g of methylethyl ketone, and heated to reflux, while bubbling a nitrogen gas. Into the dropping funnel, 34 g of methyl methacrylate, 60 g of styrene, 6 g of methacrylic acid and 0.9 g of azobisisobutyronitrile (AIBN) as an initiator were dissolved in mixture, and the mixture was dropped for about 2 hours in a state of heated to reflux. After finishing dropping, further heated to reflux for 6 hours, and methylethyl ketone solution containing 0.1 g of AIBN was dropped for 15 minutes. Thereafter, heated to reflux for further 5 hours, Styrene-Acryl resin 1 was obtained.

Synthesis of Styrene-Acryl Resin 2

Styrene-acryl resin 2 was obtained in the same synthesis method as Styrene-acryl resin 1, except for changing raw materials to methyl methacrylate 28 g, styrene 60 g, and methacrylic acid 18 g.

Synthesis of Styrene-Acryl Resin 3

Styrene-acryl resin 3 was obtained in the same synthesis method as Styrene-acryl resin 1, except for changing raw materials to methyl methacrylate 22 g, styrene 60 g, and methacrylic acid 18 g.

Synthesis of Styrene-Acryl Resin 4

Styrene-acryl resin 4 was obtained in the same synthesis method as Styrene-acryl resin 1, except for changing raw materials to methyl methacrylate 16 g, styrene 60 g, and methacrylic acid 24 g.

Synthesis of Styrene-Acryl Resin 5

Styrene-acryl resin 5 was obtained in the same synthesis method as Styrene-acryl resin 1, except for changing raw materials to methyl methacrylate 40 g and styrene 60 g.

Synthesis of Styrene-Acryl Resin 6

Into a four-neck flask provided with a mechanical stirrer, a nitrogen gas directing tube, a condenser, and a dropping funnel, were loaded 150 g of isopropyl alcohol and 50 g of methylethyl ketone, and heated to reflux, while bubbling a nitrogen gas. Into the dropping funnel, 40 g of methyl methacrylate, 60 g of styrene and 0.45 g of azobisisobutyronitrile (AIBN) as an initiator were dissolved in mixture, and the mixture was dropped for about 2 hours in a state of heated to reflux. After finishing dropping, further heated to reflux for 6 hours, and methylethyl ketone solution containing 0.1 g of AIBN was dropped for 15 minutes. Thereafter, heated to reflux for further 5 hours, Styrene-Acryl resin 6 was obtained.

Preparation of Polymer Dispersant 1

Methylethyl ketone and isopropyl alcohol used in polymerization reaction were distilled away by continuing heating the reaction solution of above Styrene-Acryl resin 1 while reducing pressure. Toluene 300 ml, 150 g of mixture of polyethylene glycol#400/polypropyrene glycol#400=7/3 (hereinafter, abbreviated to as PEG#400 for polyethylene glycol#400 and PPG#400 for polypropylene glycol#400, number after # represents an average molecular weight) were added and heated to reflux, while bubbling a nitrogen gas to distil away residual water along with toluene. Amount of toluene fraction was 100 ml. After addition of 100 ml of toluene and 0.7 g of isopropyl titanate, and heating for 2 hours, transesterification was carried out by distilling away methanol formed by transesterification along with toluene. In this reaction, PEG#400 gave polyethylene oxide structure and PPG#400 gave polypropylene oxide structure in Styrene-Acryl resin 1.

After reaction, toluene was distilled away under reducing pressure. Residue was dispersed in methanol and poured to acetone to be precipitated a resin as a solid. Solvent was eliminated by filtering and followed by drying to obtain polymer dispersant 1. Ratio of each component in the dispersant was determined by NMR measurement and acid value was determined by acid value measurement according to HS K-0070 Acid value measurement by hydrolysis (total acid value measurement), and a weight average molecular weight was determined by GPC measurement. Results were listed in Table 1.

Preparation of Polymer Dispersants 2-5

In the same manner as synthesis method of polymer dispersant 1, polymer dispersant 2 was obtained by using styrene-acryl resin 2, polymer dispersant 3 was obtained by using styrene-acryl resin 3, polymer dispersant 4 was obtained by using styrene-acryl resin 4, and polymer dispersant 5 was obtained by using styrene-acryl resin 5.

Polymer Dispersant 6

After standing to cool the reaction solution of Styrene-Acryl resin 6, methylethyl ketone and isopropyl alcohol used for polymerization reaction were distilled away to obtain Polymer dispersant 6. In the following table, styrene, ethylene oxide and propylene oxide is respectively abbreviated to St, EO and PO.

TABLE 1

| Polymer dispersant | Polymer component | Acid value (mgKOH/g) | Weight average molecular weight | Component ratio*[1] St | EO | PO |
|---|---|---|---|---|---|---|
| Dispersant 1 | Styrene-Acryl resin 1 | 9 | 15,000 | 14 | 59 | 25 |
| Dispersant 2 | Styrene-Acryl resin 2 | 31 | 14,000 | 14 | 58 | 25 |
| Dispersant 3 | Styrene-Acryl resin 3 | 46 | 14,000 | 14 | 57 | 25 |
| Dispersant 4 | Styrene-Acryl resin 4 | 60 | 13,000 | 14 | 56 | 24 |
| Dispersant 5 | Styrene-Acryl resin 5 | 0 | 15,000 | 15 | 60 | 26 |
| Dispersant 6 | Styrene-Acryl resin 6 | 0 | 14,000 | 58 | — | — |

*[1]Ratio is determined by NMR analysis.

<<Preparation of Ink>>

[Preparation of Black Pigment Dispersion]

Into ion exchanged water of 66% by mass and 2-pyrolidinone of 10% by mass, pigment and polymer dispersant listed in Table 2 were mixed. Next, the aforesaid solution was dispersed by use of a horizontal type beads mill (System Zeta Mini produced by Ashizawa Finetech Ltd.) filled at a volume ratio of 80% with zirconia beads of 0.5 mm followed by eliminating zirconia beads, whereby Black pigment dispersions A to I having a black pigment content of 15% were prepared.

Herein, in Table 2, since Disperbyk-190 and Floren TG-750W contained water in products, ink were prepared by reducing water thereof from ion exchanged water listed in Table. Amount of alkali needed for neutralizing styrene-acryl resin was calculated from an acid value and species of alkali listed in Table was added.

TABLE 2

| Pigment dispersion | Pigment Species | Content | Polymer dispersant Species | EO group | Acid value (mgKOH/g) | Content (Active element) | Base used for neutralization |
|---|---|---|---|---|---|---|---|
| A | Carbon black MA7 | 15% | Disperbyk-190 | contained | 10 | 9% | No neutralization |
| B | Carbon black MA7 | 15% | Floren TG-750W | contained | 40 | 9% | NaOH |
| C | Carbon black MA7 | 15% | Johncryl 683 | None | 160 | 9% | NaOH |
| D | Mitsubishi carbon black #960 | 15% | Dispersant 1 | contained | 9 | 9% | NaOH |
| E | Mitsubishi carbon black #960 | 15% | Dispersant 2 | contained | 31 | 9% | NaOH |
| F | Carbon black MA7 | 15% | Dispersant 3 | contained | 46 | 9% | NaOH |
| G | Carbon black MA7 | 15% | Dispersant 4 | contained | 60 | 9% | NaOH |
| H | Mitsubishi carbon black #960 | 15% | Dispersant 5 | contained | 0 | 9% | No neutralization |
| I | Mitsubishi carbon black #960 | 15% | Dispersant 6 | None | 0 | 9% | No neutralization |

[Preparation of Water-Based Inkjet Ink]

Pigment dispersion and acryl copolymer resin neutralized and dissolved by amine, solvent and surfactant were mixed by an amount described in Table 3 (part by mass), and adding ion exchanged water balancing to 100 parts by mass followed by filtering the resulting solution by 5 μm filter, to prepare water-based inkjet inks K-1 to 25.

Compounds listed in Table 3 are as bellows.
(Acryl Copolymer Resin Neutralized and Dissolved by Amine)
a: Johncryl 819 produced by BASF (Tg: 57° C., acid value: 75 mgKOH/g, neutralized by ammonia)
b: Johncryl DX6500 produced by BASF (Tg: 74° C., acid value: 85 mgKOH/g, neutralized by ammonia)
c: Johncryl PDX6102B produced by BASF (Tg: 19° C., acid value: 65 mgKOH/g, neutralized by ammonia)
d: Johncryl PDX6124 produced by BASF (Tg: 19° C., acid value: 65 mgKOH/g, neutralized by dimethylamino methanol)
(Organic Solvent)
DPGPE: dipropyleneglyccl monopropyl ether
DEG: diethylene glycol
PG: propylene glycol
1,2-HDO: 1,2-hexane diol
DEGBE: diethylene glycol monobutyl ether
PGPE: propylene glycol monopropyl ether
(Surfactant)
Si: KF-351A produced by Shin-Etsu Chemical Ca, Ltd
F: Ftergent 100 and 150 produced by Neos Co., Ltd
Acetylene diol: Olfin el 010 produced by Nissin Chemical Industry Co., Ltd a nozzle density was 180 dpi (herein, dpi referred to represents a dot number per 2.54 cm).

Then, each ink was ejected onto the digitalvinyl (produced by Metamark) which was a polyvinyl chloride recording medium under the condition of bi-directionally printing with a printing resolution: 720 dpi×720 dpi, and head transportation velocity: 200 mm/sec. Solid image by 20 cm×20 cm size was printed to be a recorded image.

During printing onto the polyvinyl chloride recording medium, back side of the recording medium was heated by controlling heater to be at 45° C. at a surface temperature of the recording medium when image was recorded. After recording, the printed matter was dried by using heating fan. Herein, the surface temperature of the recording medium was determined by using Non-contact thermometer (TT-530N type produced by Horiba Ltd.).

<<Evaluation of Recorded Image>>

Recorded image formed above was evaluated according to the following method.

[Whitening of Image]

With respect to each of the resulting solid images, conditions of the films at printed image portion were visually observed and the whitening of image was evaluated based on the following criteria.

1: Extreme whitening was observed and gloss was not observed.
2: Considerable whitening was observed.
3: Slight whitening was observed.
4: Little whitening was observed.
5: No whitening was observed.

[Friction Resistance]

Each of the resulting solid images was scrubbed by dry cotton (Kanakin No. 3) and visually observed and the image density was evaluated based on the following criteria.

TABLE 3

| Ink No. | Pigment dispersion Species | Content | Acryl copolymer resin Species | Content | Solvent Species | Content | Species | Content | Surfactant Species | Content | Remarks |
|---|---|---|---|---|---|---|---|---|---|---|---|
| K-1 | A | 3 | c | 1.5 | DPGPE | 2 | DEG | 20 | Acetylene diol | 1 | Inv. |
| K-2 | A | 3 | d | 1 | DPGPE | 2 | DEG | 20 | Acetylene diol | 1 | Inv. |
| K-3 | A | 2 | b | 9 | DPGPE | 2 | DEG | 20 | Acetylene diol | 1 | Inv. |
| K-4 | A | 8 | a | 2 | DPGPE | 2 | DEG | 20 | Acetylene diol | 1 | Inv. |
| K-5 | A | 1 | b | 8 | DPGPE | 2 | DEG | 20 | Acetylene diol | 1 | Inv. |
| K-6 | A | 1.5 | b | 8 | DPGPE | 2 | DEG | 20 | Acetylene diol | 1 | Inv. |
| K-7 | A | 3 | a | 6 | DPGPE | 2 | DEG | 20 | Acetylene diol | 1 | Inv. |
| K-8 | A | 7 | c | 2 | DPGPE | 2 | DEG | 20 | Acetylene diol | 1 | Inv. |
| K-9 | A | 4 | d | 2 | DPGPE | 2 | DEG | 20 | Si | 0.5 | Inv. |
| K-10 | A | 3 | b | 6 | DPGPE | 2 | DEG | 20 | Si | 0.5 | Inv. |
| K-11 | A | 3 | b | 6 | DPGPE | 2 | PG | 20 | F | 0.5 | Inv. |
| K-12 | A | 3 | b | 6 | 1,2-HDO | 16 | DEG | 15 | F | 0.5 | Inv. |
| K-13 | A | 3 | b | 6 | DEGBE | 18 | DEG | 10 | Si | 0.5 | Inv. |
| K-14 | A | 3 | b | 6 | DPGPE | 4 | DEG | 15 | Si | 0.5 | Inv. |
| K-15 | B | 3 | b | 6 | DPGPE | 4 | DEG | 15 | Si | 0.5 | Inv. |
| K-16 | A | 3 | b | 6 | 1,2-HDO | 10 | PG | 15 | Si | 0.5 | Inv. |
| K-17 | A | 3 | b | 6 | DEGBE | 14 | DEG | 10 | Si | 0.5 | Inv. |
| K-18 | A | 3 | b | 6 | PGPE | 6 | DEG | 15 | Si | 0.5 | Inv. |
| K-19 | C | 3 | b | 6 | DPGPE | 4 | DEG | 20 | Acetylene diol | 1 | Comp. |
| K-20 | D | 3 | b | 6 | DPGPE | 4 | DEG | 15 | Si | 0.5 | Inv. |
| K-21 | E | 3 | b | 6 | DPGPE | 4 | DEG | 20 | Si | 0.5 | Inv. |
| K-22 | F | 3 | b | 6 | DPGPE | 4 | DEG | 15 | Si | 0.5 | Inv. |
| K-23 | G | 3 | b | 6 | DPGPE | 4 | DEG | 15 | Si | 0.5 | Comp. |
| K-24 | H | 3 | b | 6 | DPGPE | 4 | DEG | 15 | Si | 0.5 | Inv. |
| K-25 | I | 3 | b | 6 | DPGPE | 4 | DEG | 15 | Si | 0.5 | Comp. |

<<Image Formation>>

Each ink set prepared above was set in an on-demand type inkjet printer with a maximum recording density of 1440×1440 dpi having piezo type heads where a nozzle pore size was 28 μm, a driving frequency was 18 kHz, a nozzle number was 512, an amount of an minimum ink droplet was 14 pl, and 1: Image density became lowered during frictions of less than 10 times.

2: Image density became lowered during frictions between 10 and less than 20 times.

3: Image density became lowered during frictions between 20 and less than 50 times.

4: Slight scratch remained but did not affect image density after frictions of 50 times.

5: No change was observed in image during frictions of 50 times or more.

[Image Quality]

With respect to each of the resulting solid images, banding was visually observed and evaluated based on the following criteria.

1: Patchy pattern was observed over all of solid image.

2: Apparent stripe was observed vertical to conveying direction.

3: Light stripe was observed entirely vertical to conveying direction.

4: Slight stripe was observed vertical to conveying direction.

5: No patchy pattern was observed and uniform image was obtained.

[Ejection Stability]

Each ink set prepared above was ejected by piezo type inkjet heads where a nozzle pore size was 28 μm, a nozzle number was 512, a driving frequency was 18 kHz, an amount of an minimum ink droplet was 14 pl at ambiences of 15° C. and 40% RH. The ejection state of the nozzle on printing was visually observed and the ink ejection stability was evaluated based on the following criteria.

1: Curved ejections were observed in 11 nozzles or more.

2: Curved ejections were observed in 2-10 nozzles.

3: Curved ejection was observed in 1 nozzle.

4: No variation of the ejection state was observed in all of the nozzles.

[Storage Stability of Ink]

Each prepared ink was stored in a vessel of polypropylene with airtight stopper at 40° C. for 1 week. After storage, each ink was ejected under the same inkjet head and ejection condition and the ejection state was visually observed and storage stability of the ink was evaluated based on the following criteria.

1: Nozzle clogging was observed in more than 16 nozzles.

2: Nozzle clogging was observed in 6-15 nozzles.

3: Nozzle clogging was observed in 1-5 nozzles.

4: There is no ejection disorder in all nozzles.

[Maintenance Returnability]

After continuously ejecting ink for 5 minutes at ambiences of 15° C. and 40% RH, then, nozzle surface was standing for 10 minutes without capping. Subsequently, maintenance of nozzle was carried out, nozzle clogging of each nozzle was confirmed and maintenance returnability was evaluated based on the following criteria.

1: Nozzle clogging was not recovered by 6 times of maintenances.

2: Nozzle clogging was recovered by 3-5 times of maintenances.

3: Nozzle clogging was recovered by 2 times of maintenances.

4: Nozzle clogging was recovered by one maintenance.

Results were listed in Table 3.

TABLE 4

| Ink No. | Whitening of Image film | Image Durability | Image Quality | Ejection stability | Ink storage stability | Maintenance returnability | Remarks |
|---|---|---|---|---|---|---|---|
| K-1 | 4 | 3 | 3 | 3 | 3 | 3 | Inv. |
| K-2 | 4 | 3 | 3 | 3 | 3 | 3 | Inv. |
| K-3 | 3 | 4 | 3 | 2 | 2 | 2 | Inv. |
| K-4 | 5 | 3 | 3 | 2 | 3 | 2 | Inv. |
| K-5 | 3 | 5 | 3 | 2 | 2 | 2 | Inv. |
| K-6 | 3 | 5 | 3 | 2 | 2 | 3 | Inv. |
| K-7 | 4 | 4 | 3 | 3 | 3 | 3 | Inv. |
| K-8 | 4 | 4 | 3 | 3 | 3 | 2 | Inv. |
| K-9 | 5 | 4 | 4 | 4 | 3 | 4 | Inv. |
| K-10 | 5 | 5 | 4 | 3 | 3 | 4 | Inv. |
| K-11 | 5 | 5 | 4 | 3 | 3 | 4 | Inv. |
| K-12 | 5 | 5 | 4 | 3 | 2 | 4 | Inv. |
| K-13 | 4 | 5 | 5 | 3 | 2 | 3 | Inv. |
| K-14 | 5 | 5 | 5 | 4 | 3 | 4 | Inv. |
| K-15 | 4 | 5 | 5 | 4 | 3 | 4 | Inv. |
| K-16 | 5 | 5 | 5 | 4 | 4 | 4 | Inv. |
| K-17 | 4 | 5 | 5 | 4 | 3 | 3 | Inv. |
| K-18 | 4 | 5 | 5 | 4 | 4 | 4 | Inv. |
| K-19 | 1 | 2 | 3 | 3 | 1 | 3 | Comp. |
| K-20 | 5 | 5 | 5 | 4 | 3 | 4 | Inv. |
| K-21 | 4 | 5 | 5 | 4 | 3 | 4 | Inv. |
| K-22 | 5 | 5 | 5 | 4 | 3 | 4 | Inv. |
| K-23 | 1 | 2 | 3 | 3 | 2 | 2 | Comp. |
| K-24 | 5 | 5 | 5 | 4 | 3 | 4 | Inv. |
| K-25 | 2 | 2 | 3 | 3 | 1 | 2 | Comp. |

Table 4 shows that the ink and the method for producing an inkjet printed product of the present invention is effective in inhibiting whitening of the recorded image film and in enhancing durability of the image. Further, excellent image quality, ink ejection properties and ink storage properties can be realized.

Example 2

Polymer Dispersant

Ethylene oxide-propylene oxide copolymers shown in Table 5 were used as polymer dispersants.

TABLE 5

| Polymer dispersant | *1 | Weight average molecular weight | Acid value (mgKOH/g) | Component ratio *2 | |
|---|---|---|---|---|---|
| | | | | EO | PO |
| Dispersant 7 | EO-PO copolymer 1 | 8,000 | 0 | 78 | 20 |

TABLE 5-continued

| Polymer dispersant | *1 | Weight average molecular weight | Acid value (mgKOH/g) | Component ratio *2 | |
|---|---|---|---|---|---|
| | | | | EO | PO |
| Dispersant 8 | EO-PO co-polymer 2 | 11,000 | 0 | 82 | 19 |
| Dispersant 9 | EO-PO co-polymer 3 | 4,500 | 0 | 55 | 40 |

*1 Polymer dispersant containing polyethylene oxide group having acid value less than 50 mgKOH/g
*2 Ratio is determined by NMR.

in Table 5 were mixed. Next, the aforesaid solution was dispersed by use of a horizontal type beads mill (System Zeta Mini produced by Ashizawa Finetech Ltd.) filled at a volume ratio of 80% with zirconia beads of 0.5 mm followed by eliminating zirconia beads, whereby Black pigment dispersions J to L having a black pigment content of 15% were prepared.

Further, in the same manner as Black pigment dispersions J to L, Black pigment dispersions N and M were prepared as shown in Table 7 except for using the Styrene-acryl resin 6 and 7 instead of polymer dispersant having acid value less than 50 mgKOH/g. Amount of alkali needed for neutralizing styrene-acryl resin was calculated from an acid value and species of alkali listed in Table was added.

TABLE 6

| Pigment dispersion | Pigment | | Polymer dispersant containing polyethylene oxide group of acid value 50 mgKOH/g or less | | |
|---|---|---|---|---|---|
| | Species | Content | Species | EO group | Acid value (mgKOH/g) | Content |
| J | Mitsubishi carbon black #960 | 15% | Dispersant 7 | contained | 0 | 9% |
| K | Mitsubishi carbon black #960 | 15% | Dispersant 8 | contained | 0 | 9% |
| L | Mitsubishi carbon black #960 | 15% | Dispersant 9 | contained | 0 | 9% |

TABLE 7

| Pigment dispersion | Pigment | | Polymer dispersant | | | | Base used for neutralization |
|---|---|---|---|---|---|---|---|
| | Species | Content | Species | EO group | Acid value (mgKOH/g) | Content | |
| M | Mitsubishi carbon black #960 | 15% | Styrene-acryl resin 7 | None | 65 | 9% | NaOH |
| N | Mitsubishi carbon black #960 | 15% | Styrene-acryl resin 6 | None | 0 | 9% | — |

[Synthesis of Styrene-Acryl Resin 7]

Into a 500 ml of four-neck flask provided with a mechanical stirrer, a nitrogen gas directing tube, a condenser, and a dropping funnel, were loaded 150 g of isopropyl alcohol and 50 g of methylethyl ketone, and heated to reflux, while bubbling a nitrogen gas. Into the dropping funnel, 30 g of methyl methacrylate, 60 g of styrene, 10 g of methacrylic acid and 0.45 g of azobisisobutyronitrile (AIBN) as an initiator were dissolved in mixture, and the mixture was dropped for about 2 hours in a state of heated to reflux. After finishing dropping, further heated to reflux for 6 hours, and methylethyl ketone solution containing 0.1 g of AIBN was dropped for 15 minutes. Thereafter, heated to reflux for further 5 hours, Styrene-Acryl resin 7 was obtained.

<<Preparation of Ink>>

[Preparation of Black Pigment Dispersion]

Into ion exchanged water of 66% by mass and 2-pyrolidinone of 10% by mass, pigment and polymer dispersant listed

[Synthesis of Acryl Copolymer Resin]
[Synthesis of Acryl Copolymer Resin 1]

Into a 500 ml of four-neck flask provided with a mechanical stirrer, a nitrogen gas directing tube, a condenser, and a dropping funnel, were loaded 200 g of isopropyl alcohol and heated to reflux, while bubbling a nitrogen gas. Into the dropping funnel, 65 g of methyl methacrylate, 5 g of n-butyl acrylate, 10 g of 2-ethylhexyl acrylate, 20 g of metharylic acid and 0.3 g of azobisisobutyronitrile (AIBN) as an initiator were dissolved in mixture, and the mixture was dropped for about 2 hours in a state of heated to reflux. After finishing dropping, further heated to reflux for 6 hours, and methylethyl ketone solution containing 0.1 g of AIBN was dropped for 15 minutes. Thereafter, heated to reflux for further 5 hours, Acryl copolymer resin 1 was obtained.

[Synthesis of Acryl Copolymer Resin 2]

Acryl copolymer resin 2 was obtained in the same manner as synthesis of Acryl copolymer resin 1, except for changing raw materials to methyl methacrylate 73 g, n-butyl acrylate 5 g, 2-ethylhexyl acrylate 10 g, and methacrylic acid 12 g.

[Synthesis of Acryl Copolymer Resin 3]

Acryl copolymer resin 3 was obtained in the same manner as synthesis of Acryl copolymer resin 1, except for changing raw materials to methyl methacrylate 78 g, n-butyl acrylate 3 g, 2-ethylhexyl acrylate 10 g, and methacrylic acid 9 g.

[Synthesis of Acryl Copolymer Resin 4]

Acryl copolymer resin 4 was obtained in the same manner as synthesis of Acryl copolymer resin 1, except for changing raw materials to styrene 15 g, methyl methacrylate 50 g, n-butyl acrylate 5 g, 2-ethylhexyl acrylate 10 g, and methacrylic acid 20 g.

[Synthesis of Acryl Copolymer Resin 5]

Acryl copolymer resin 5 was obtained in the same manner as synthesis of Acryl copolymer resin 1, except for changing raw materials to styrene 5 g, methyl methacrylate 60 g, n-butyl acrylate 5 g, 2-ethylhexyl acrylate 10 g, and methacrylic acid 20 g.

[Synthesis of Acryl Copolymer Resin 6]

Acryl copolymer resin 6 was obtained in the same manner as synthesis of Acryl copolymer resin 1, except for changing raw materials to styrene 5 g, methyl methacrylate 68 g, n-butyl acrylate 5 g, 2-ethylhexyl acrylate 10 g, and methacrylic acid 12 g.

Acid value of the resulting Acryl copolymer resins were determined by acid value measurement according to HS K-0070 Acid value measurement by hydrolysis (total acid value measurement). Weight average molecular weight was determined by GPC measurement.

The glass transition temperature (Tg) was determined by using, a DSC-7 differential scanning calorimeter (produced by Perkin Elmer Corp.) or a TAC7/DX thermal analysis controller (made by Perkin Elmer Corp.). The measurement is conducted as follows. A resin in an amount of 10.00 mg is precisely weighed to two places of decimals, sealed into an aluminum pan (KIT NO. 0219-0041) and set into a DSC-7 sample holder. An empty aluminum pan is used as a reference. Temperature is controlled through heating-cooling-heating at a temperature-raising rate of 10° C./min and a temperature-lowering rate of 10° C./min in the range of 0 to 130° C. An extension line from the base-line prior to the initial rise of the first endothermic peak and a tangent line exhibiting the maximum slope between the initial rise and the peak are drawn and the intersection of both lines is defined as the glass transition point Tg.

Evaluation results were listed in Table 8.

TABLE 8

|  | Acid value (mgKOH/g) | Tg (° C.) | Weight average molecular weight |
|---|---|---|---|
| Acryl copolymer resin 1 | 120 | 82 | 32,000 |
| Acryl copolymer resin 2 | 72 | 82 | 34,000 |
| Acryl copolymer resin 3 | 61 | 85 | 38,000 |
| Acryl copolymer resin 4 | 130 | 80 | 32,000 |
| Acryl copolymer resin 5 | 130 | 77 | 35,000 |
| Acryl copolymer resin 6 | 80 | 76 | 37,000 |

[Preparation of Water-Based Inkjet Ink]

Six parts of the acryl copolymer resin was added into 30 parts of ion exchanged water, then N, N-dimethylamino ethanol was added in an amount of 1.05 chemical equivalent based on an acid group of the Acryl copolymer resin and dissolved while heat-stirring at 60° C. After standing to cool, mixed were pigment dispersion and acryl copolymer resin neutralized and dissolved by amine in an amount described in Table 9 (part by mass), other component as common in all inks such that 1% of styrene-acryl resin, DPGPE 4% by mass, DEG 15%, Si based surfactant (KF-351A produced by Shin-Etsu Chemical Co., Ltd.) 0.5% and ion exchanged water balancing to 100 parts by mass followed by filtering the resulting solution by 5 μm filter, and water-based inkjet inks K-26 to 37 shown in Table 9 were obtained. Herein, pigment dispersant D and E were used as the common one in Example 1.

TABLE 9

| Ink No. | Pigment dispersion Species | Content (in terms of solid) | Acryl copolymer resin Species | Content | Remarks |
|---|---|---|---|---|---|
| K-26 | J | 3 | Acryl copolymer resin 6 | 6 | Inv. |
| K-27 | K | 3 | Acryl copolymer resin 6 | 6 | Inv. |
| K-28 | L | 3 | Acryl copolymer resin 6 | 6 | Inv. |
| K-29 | D | 3 | Acryl copolymer resin 6 | 6 | Inv. |
| K-30 | E | 3 | Acryl copolymer resin 6 | 6 | Inv. |
| K-31 | M | 3 | Acryl copolymer resin 6 | 6 | Comp. |
| K-32 | N | 3 | Acryl copolymer resin 6 | 6 | Comp. |
| K-33 | E | 3 | Acryl copolymer resin 1 | 6 | Inv. |
| K-34 | E | 3 | Acryl copolymer resin 2 | 6 | Inv. |
| K-35 | E | 3 | Acryl copolymer resin 3 | 6 | Inv. |
| K-36 | E | 3 | Acryl copolymer resin 4 | 6 | Inv. |
| K-37 | E | 3 | Acryl copolymer resin 5 | 6 | Inv. |

<<Image Formation>>

20 cm×20 cm of solid image was printed to be recorded image by employing the same inkjet printer and the same conditions of recording medium, printing resolution and conveying speed as Example 1.

During printing onto the polyvinyl chloride recording medium, back side of the recording medium was heated by controlling heater to be 60° C. at a surface temperature of the recording medium when image was recorded. After recording, the printed matter was dried by using heating fan. Herein, the surface temperature of the recording medium was determined by using Non-contact thermometer (TT-530N type produced by Horiba Ltd.).

<<Evaluation of Recorded Image>>

Recorded image formed above was evaluated according to the following method.

[Whitening of Image]

With respect to each of the resulting solid images, conditions of the films at printed image portion were visually observed and the whitening of image was evaluated based on the following criteria.

1: Extreme whitening and no gloss was observed.
2: Considerable whitening was observed.
3: Slight whitening was observed.
4: Little whitening was observed.
5: No whitening was observed.

(Adhesion)

Adhesive tape SCOTCH #250 (produced by SUMITOMO 3M CO., LID.) was adhered onto each resulting solid image according to the cross-cut adhesion test of RS K 5400, and a 2 kg roller was reciprocated one time to press the adhered tape. After that, the tape was quickly peeled from the cured layer, and the percentage of the remaining cross-cut sample was determined to evaluate adhesion 3: Percentage of the remaining cross-cut sample was 80 to 100%.

2: Percentage of the remaining cross-cut sample was 60 to 80%.

1: Percentage of the remaining cross-cut sample was less than 60%.

Results were listed in Table 10.

TABLE 10

| Ink No. | Whitening of Image film (60° C.) | Adhesion | Remarks |
| --- | --- | --- | --- |
| K-26 | 4 | 3 | Inv. |
| K-27 | 4 | 3 | Inv. |
| K-28 | 3 | 3 | Inv. |
| K-29 | 5 | 3 | Inv. |
| K-30 | 5 | 3 | Inv. |
| K-31 | 1 | 2 | Comp. |
| K-32 | 2 | 1 | Comp. |
| K-33 | 5 | 2 | Inv. |
| K-34 | 5 | 3 | Inv. |
| K-35 | 5 | 3 | Inv. |
| K-36 | 5 | 2 | Inv. |
| K-37 | 5 | 2 | Inv. |

Table 10 shows that ink and a method for producing an inkjet printed product of the present invention is effective in inhibiting whitening of the recorded image film and in having excellent adhesion to the recording medium.

What is claimed is:

1. A water-based inkjet ink comprising at least a) a pigment, b) a polymer dispersant comprising polyethylene oxide groups having an acid value of less than 50 mgKOH/g, c) acryl copolymer resin having an acid value of not less than 50 mgKOH/g and not more than 100 mgKOH/g, d) at least one water-soluble organic solvent selected from glycol ethers or 1,2-alkanediols having 4 or more carbon atoms, and (e) a silicone based or fluorine based surfactant, wherein the acryl copolymer resin consists of acryl based monomers, methacryl based monomers, or a combination thereof.

2. The water-based inkjet ink of claim 1, wherein a total amount of at least one water-soluble organic solvent selected from glycol ethers or 1,2-alkanediols having 4 or more carbon atoms is 3-15% by mass based on the water-based inkjet ink.

3. The water-based inkjet ink of claim 1, wherein the acryl copolymer resin is partially or completely neutralized by an amine.

4. The water-based inkjet ink of claim 1, wherein the polymer dispersant comprising polyethylene oxide groups having an acid value of less than 50 mgKOH/g is an acryl copolymer comprising polyethylene oxide groups.

5. The water-based inkjet ink of claim 1, wherein the acryl copolymer resin is synthesized by a monomer consisting of the acryl or the methacryl based monomers.

6. A method for producing an inkjet printed product, wherein the water-based inkjet ink of claim 1 is printed on a preliminary heated recording medium.

7. The method for producing an inkjet printed product of claim 6, wherein the recording medium is a non-water-absorption recording medium.

8. The method for producing an inkjet printed product of claim 6, wherein the water-based inkjet ink is printed followed by drying the recording medium by using drying member.

9. A method for producing an inkjet ink, comprising:
mixing a pigment and a polymer dispersant comprising polyethylene oxide groups having an acid value of less than 50 mgKOH/g to form a pigment dispersion; and
mixing the pigment dispersion, an acryl copolymer resin, a solvent, and a surfactant to produce the inkjet ink, wherein
the solvent is a water-soluble organic solvent selected from glycol ethers or 1,2-alkanediols having 4 or more carbon atoms,
the surfactant is a silicon based or fluorine base surfactant, and
the acryl copolymer resin has an acid value of not less than 50 mgKOH/g and not more than 100 mgKOH/g and the acryl copolymer consists of acryl based monomers, methacryl based monomers, or a combination thereof.

10. The method for producing an inkjet ink of claim 9, wherein a weight average molecular weight of the polymer dispersant comprising polyethylene oxide groups having an acid value of less than 50 mgKOH/g is not less than 5,000 and not more than 1,000,000.

* * * * *